US007194109B2

(12) United States Patent
Nakamura et al.

(10) Patent No.: US 7,194,109 B2
(45) Date of Patent: Mar. 20, 2007

(54) METHOD AND SYSTEM FOR DELIVERING MONITORED IMAGE SIGNAL OF SUBJECT TO BE MONITORED

(75) Inventors: Yoshifumi Nakamura, Tokorozawa (JP); Jun Hagiwara, Higashimurayama (JP)

(73) Assignee: Hitachi Kokusai Electric, Inc., Tokyo (JP)

( * ) Notice: Subject to any disclaimer, the term of this patent is extended or adjusted under 35 U.S.C. 154(b) by 580 days.

(21) Appl. No.: 10/229,000

(22) Filed: Aug. 28, 2002

(65) Prior Publication Data

US 2003/0044046 A1 Mar. 6, 2003

(30) Foreign Application Priority Data

Aug. 30, 2001 (JP) ............................. 2001-261449

(51) Int. Cl.
*G06K 9/00* (2006.01)

(52) U.S. Cl. ....................................... 382/103; 348/169

(58) Field of Classification Search ................ 382/103; 348/169–172

See application file for complete search history.

(56) References Cited

U.S. PATENT DOCUMENTS

| | | | | |
|---|---|---|---|---|
| 5,786,746 | A * | 7/1998 | Lombardo et al. | 340/286.07 |
| 5,793,290 | A * | 8/1998 | Eagleson et al. | 340/573.4 |
| 6,226,031 | B1 * | 5/2001 | Barraclough et al. | 348/14.13 |
| 2001/0008415 | A1 * | 7/2001 | Park | 348/143 |
| 2002/0015094 | A1 * | 2/2002 | Kuwano et al. | 348/143 |

FOREIGN PATENT DOCUMENTS

| | | |
|---|---|---|
| JP | A-2001-339708 | 12/2001 |
| JP | 2002 197565 | 7/2002 |
| JP | 2002269209 | 9/2002 |

* cited by examiner

*Primary Examiner*—Bhavesh M. Mehta
*Assistant Examiner*—Craig W. Kronenthal
(74) *Attorney, Agent, or Firm*—Mattingly, Stanger, Malur & Brundidge, P.C.

(57) ABSTRACT

A monitor transmits the monitored image signals which have been obtained by imaging subjects to be monitored corresponding to terminals of image signals from a plurality of image pickup apparatuses to the corresponding terminals, respectively. At the terminals, the monitored image signals which have been obtained by imaging subjects to be monitored corresponding to the terminals are respectively received to display the monitored image signals thus received, respectively.

13 Claims, 12 Drawing Sheets

FIG. 11A

| DELIVERY DESTINATION OF MONITORED IMAGE SIGNAL | IDENTIFICATION CODE | RECEPTION INTERVAL |
|---|---|---|
| 090-1XXX-XXXX | ······· | 5 MIN |
| 090-2XXX-XXXX | ······· | 10 MIN |
| 090-3XXX-XXXX | ······· | 15 MIN |
| | | |
| | | |

FIG. 11B MOVEMENT INFORMATION

| TIME | POSITION (X-COORDINATE, Y-COORDINATE) | DIRECTION OF FACE OF CHILD AS SUBJECT TO BE MONITORED |
|---|---|---|
| 10:00 | (300,500) | 320° |
| 10:05 | (250,400) | 350° |
| 10:10 | (200,420) | 120° |
| | | |
| | | |

FIG. 11C CURRENT IMAGE SELECTION DELIVERY INFORMATION

| TIME | IMAGE PICKUP CAMERA NO. | DIAPHRAGM VALUE | FOCAL LENGTH | ROOM POSITION |
|---|---|---|---|---|
| 10:00 | 1 | F5.6 | 38mm | ROOM A |
| 10:05 | 1 | F5.6 | 38mm | ROOM A |
| 10:10 | 2 | F4 | 24mm | ROOM A |
| | | | | |
| | | | | |

FIG. 11D
RECEPTION INTERVAL SETTING INFORMATION

| TIME | RECEPTION INTERVAL SET VALUE |
|---|---|
| 10:00 | AT INTERVALS OF 5 MIN |
| 10:05 | AT INTERVALS OF 5 MIN |
| 10:10 | AT INTERVALS OF 5 MIN |
| | |
| | |

FIG. 11E
DELIVERY DESTINATION INFORMATION

| TIME | DELIVERY DESTINATION |
|---|---|
| 10:00 | CELLULAR PHONE : 090-XXXX-XXXX |
| 10:05 | CELLULAR PHONE : 090-XXXX-XXXX |
| 10:10 | CELLULAR PHONE : 090-XXXX-XXXX |
| | |
| | |

METHOD AND SYSTEM FOR DELIVERING MONITORED IMAGE SIGNAL OF SUBJECT TO BE MONITORED

BACKGROUND OF THE INVENTION

1. Field of the Invention

The present invention relates a method and a system for delivering monitored or surveillanced images which are adapted to deliver image signals which have been obtained by picking up or imaging subjects to be monitored to terminals associated with the subjects to be monitored.

2. Description of the Related Art

Heretofore, there has been employed a system for carrying out the monitoring by imaging things each becoming a subject to be monitored using an image pickup apparatus. For example, in the case of a monitoring system for carrying out the image pickup using one image pickup apparatus, only the things which are present within the image pickup area of the one image pickup apparatus can be monitored, but when the things are each present outside the image pickup area thereof, such things can not be monitored at all.

Then, conventionally, there is a monitoring system wherein the area where a subject to be monitored may be present is divided into a plurality of parts so that the corresponding partial areas may be simultaneously imaged with a plurality of image pickup apparatuses, respectively, and a subject to be monitored is imaged with at least one image pickup apparatus of them, thereby allowing a subject to be monitored to be more continuously monitored. Such a system, for example, is disclosed in JP-A-2001-339708.

However, in such a monitoring system, the monitoring is carried out in such a way that all of image signals which have been obtained through the image pickup with a plurality of image pickup apparatuses are transmitted from the image pickup apparatuses to a monitoring display device to be seen and heard simultaneously, and so forth. Then, it is necessary to confirm on which image signal of the image signals from a plurality of image pickup apparatuses a subject to be monitored is imaged. For this reason, the images in which a subject to be monitored has not been imaged and which are all essentially unnecessary are transmitted in many cases, so that the transmission efficiency is degraded as compared with a case where only the images in which the subject to be monitored has been imaged are transmitted. In addition thereto, for a person as well seeing and hearing monitored images, since the number of cases where he/her must see and hear unnecessary images increases, it takes labor and time for him/she to search for the image on which a subject to be monitored is taken, and hence the efficiency of the monitoring system is excessively poor.

In the above-mentioned prior art, in the case where a monitoring display device has a limited ability to display thereon a monitored image(s), in the case where a toll required to utilize a communication network or a communication line for use in the transmission thereof, in particular, a burden for a specific toll is required, since unnecessary image signals are transmitted to be displayed, the useless labor or cost must be born.

SUMMARY OF THE INVENTION

In the light of the foregoing, the present invention has been made in order to solve the above-mentioned problems associated with the prior art, and is, therefore, an object of the present invention to provide a method and a system for delivering monitored signals which are adapted to dissolve the above-mentioned problems of the prior art.

It is another object of the present invention to provide a method and a system for delivering monitored signals which are adapted to further enhance the transmission efficiency and the work efficiency of the work required to carry out the monitoring work when monitoring continuously subjects to be monitored.

In order to solve the above-mentioned problems, according to one aspect of the present invention, there is provided a monitored image signal delivering system having a monitor, a communication network, and a plurality of terminals, the system being adapted to deliver image signals obtained through the image pickup with the monitor to the terminals. The system includes:

the monitor having a plurality of image pickup apparatuses for outputting image signals, and a controller for transmitting the monitored image signals obtained by imaging subjects to be monitored corresponding to the terminals of the image signals from the plurality of image pickup apparatuses to the corresponding terminals, respectively; and the plurality of terminals each having a unit for receiving as its input the monitored image signal obtained by imaging the subject to be monitored corresponding to the associated one of the terminals from the monitor, and a display unit for displaying thereon the monitored image signal thus received.

By adopting such a configuration, for example, it is possible to realize a monitored image signal delivering system in the form of a network. As per the present invention, in a nursery school in which there are children nursed in the nursery school each as a subject to be monitored therein is linked to protectors concerned in the children. That is to say, even when image signals which have been obtained by imaging children nursed in the nursery school are transmitted to be displayed on terminals such as cellular phones, it is possible to further suppress the communication cost required for the image data. Further, an image which a protector as an operator of a terminal such as a cellular phone desires, i.e., an image on which a child concerned in the protector is imaged can be displayed on the associated one of the terminals at any time.

Other objects, features and advantages of the invention will become apparent from the following description of the embodiments of the invention taken in conjunction with the accompanying drawings.

BRIEF DESCRIPTION OF THE DRAWINGS

FIGS. 11A to 11E are respectively diagrams each useful in explaining an example of data accumulated in a database for each subject to be imaged;

DETAILED DESCRIPTION OF THE EMBODIMENTS

Figure 1:
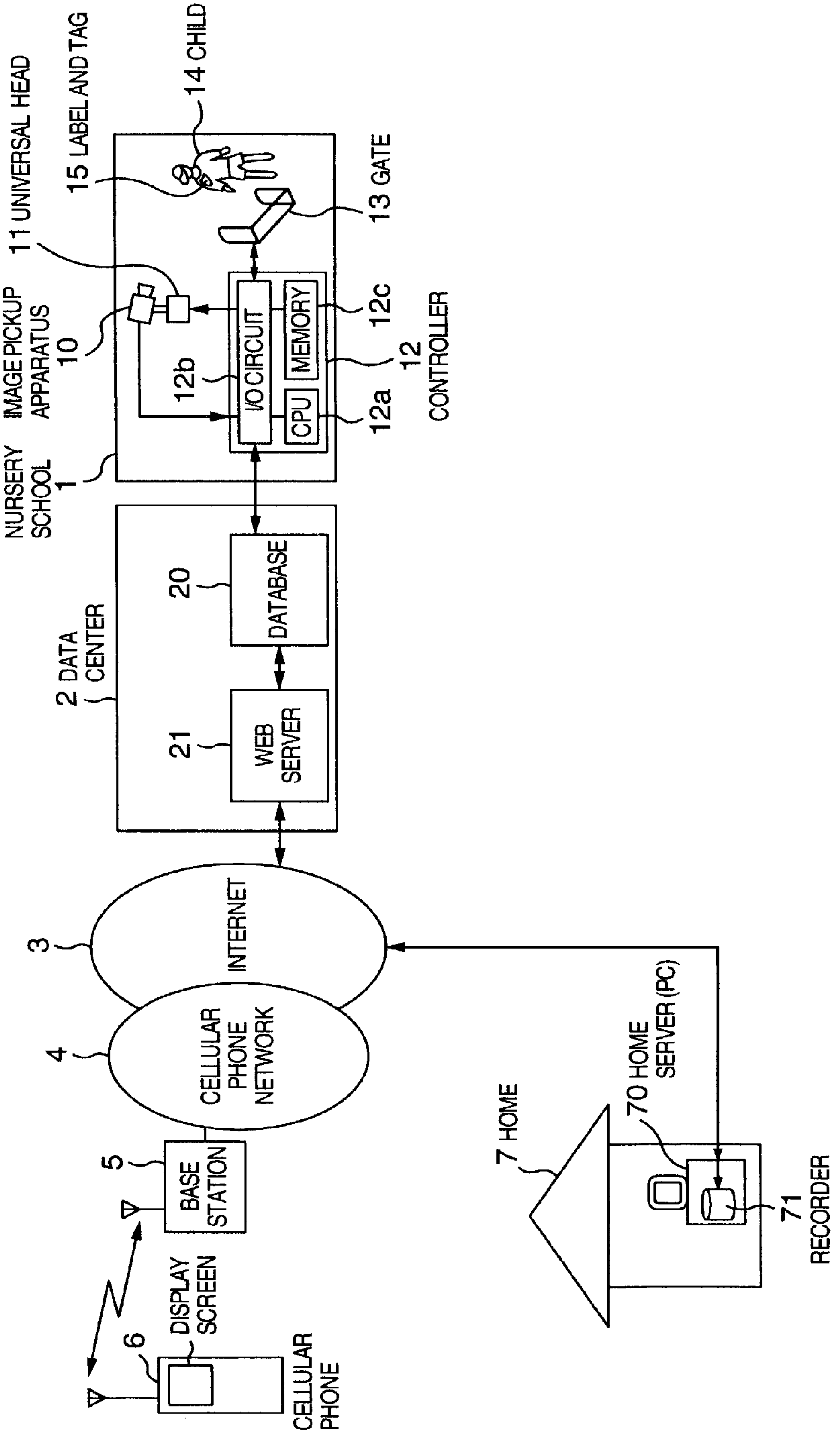
FIG. 1 is a block diagram showing construction of an embodiment of a monitored or surveillanced image signal delivering system according to the present invention.

The embodiments of the present invention will hereinafter be described in detail with reference to the accompanying drawings.

In the following description, the same constituent elements are designated by the same reference numerals and the repeated description thereof will be omitted here for the sake of simplicity.

Figure 2:
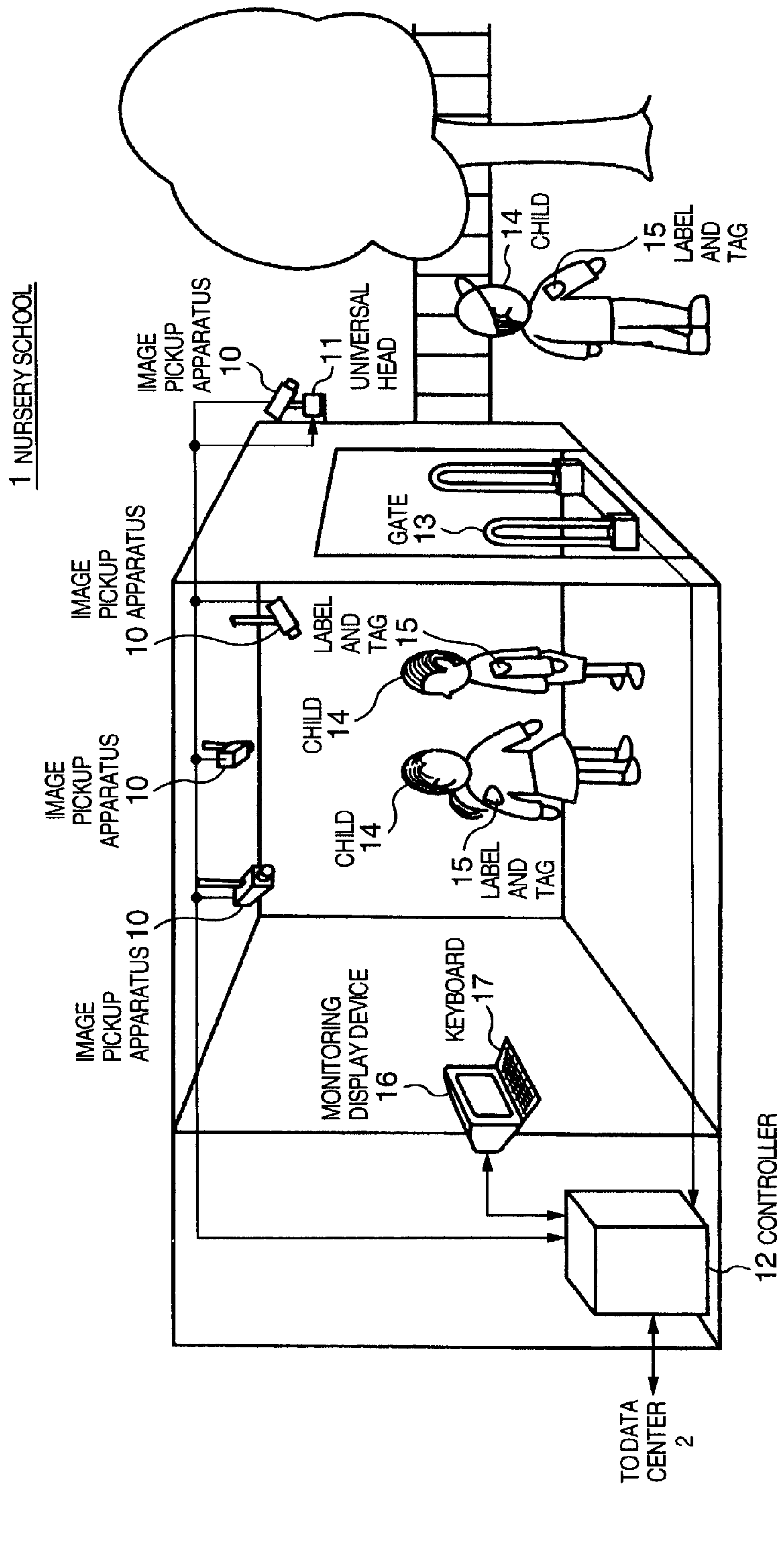
FIG. 2 is a view useful in explaining schematically a monitor installed in a nursery school 1 concerned in the monitored image signal delivering system of the present invention and the situation of a label and tag attached to the vicinity of the upper arm part of a child as a subject to be monitored.
Figure 3A:
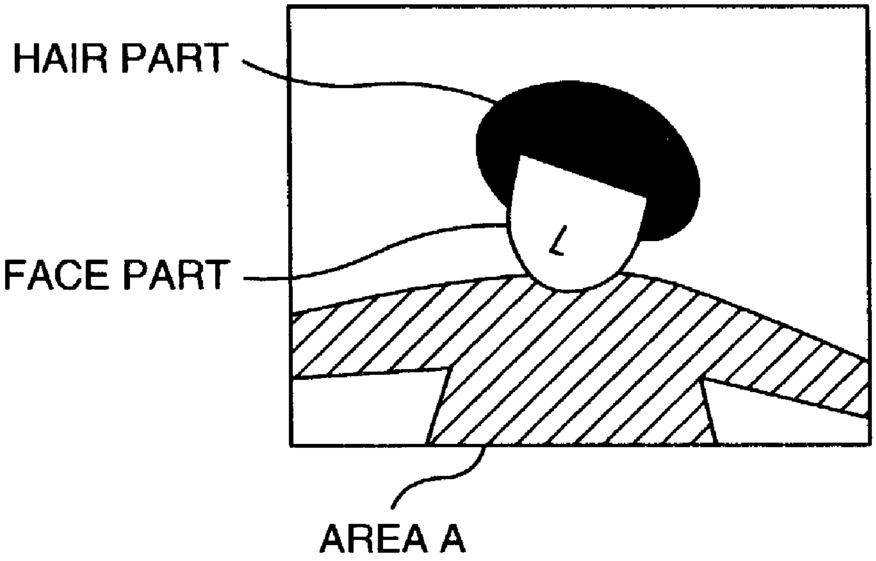
FIGS. 3A and 3B are respectively views showing an example of an imaged picture which is selected in order to deliver a monitored image signal.
Figure 3B:
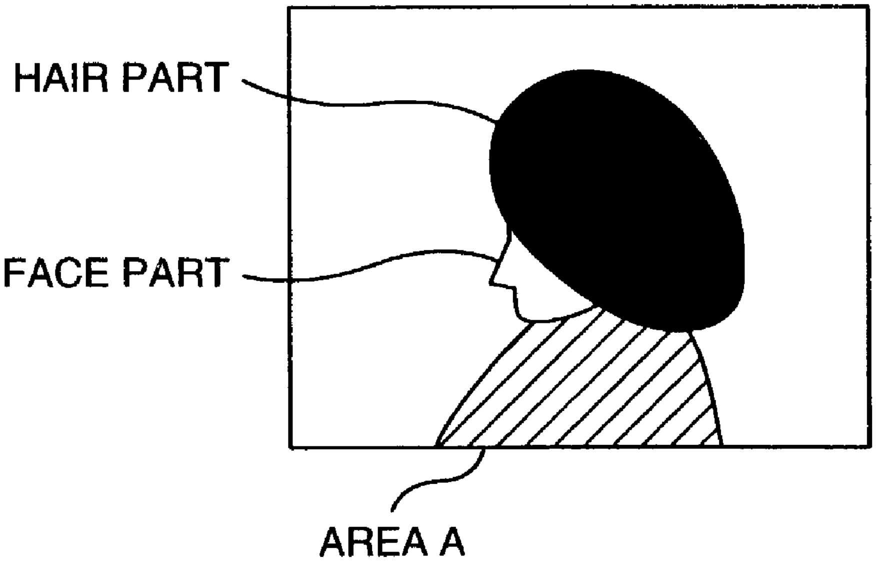
Figure 4:
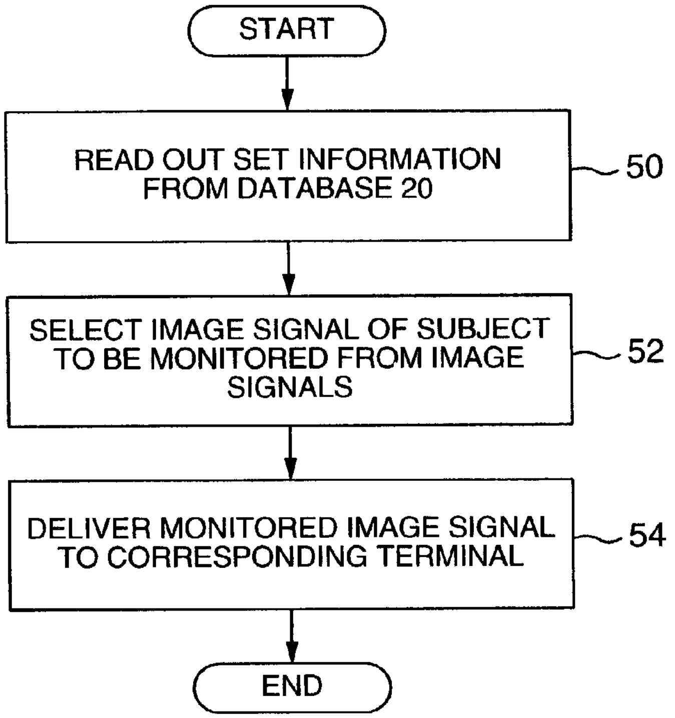
FIG. 4 is a flow chart useful in explaining the operation of the embodiment according to the present invention.
Figure 5:
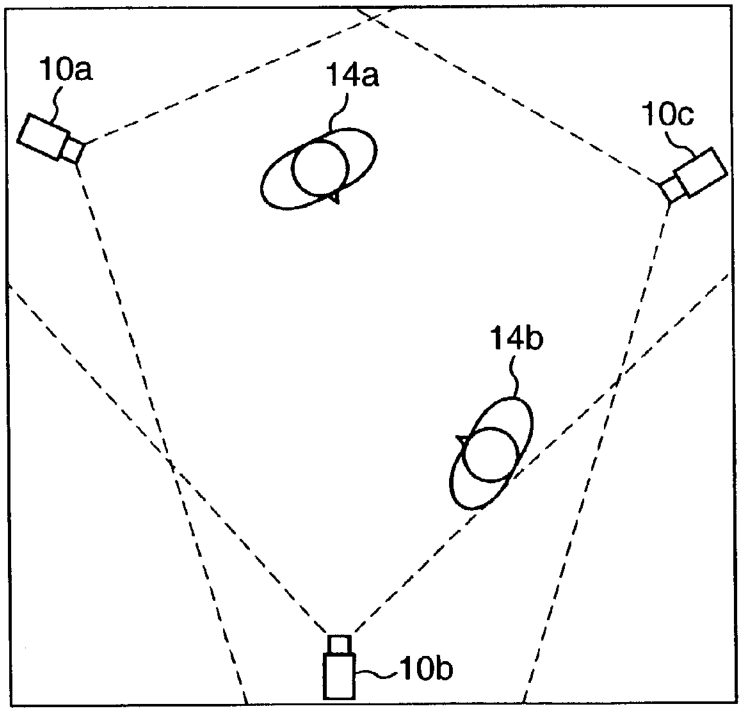
FIG. 5 is a view showing the planar arrangement of three image pickup cameras and the planar arrangement of two children each as a subject to be monitored.
Figure 6A:
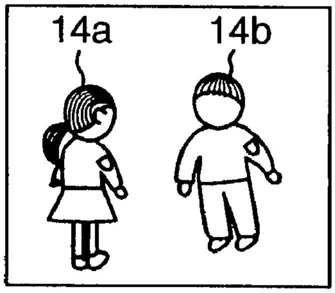
FIGS. 6A to 6C are respectively views exemplifying the situations of imaged pictures when these image pickup cameras shown in FIG. 5 imaged two children simultaneously.
Figure 6B:
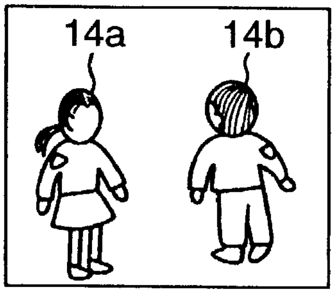
Figure 6C:
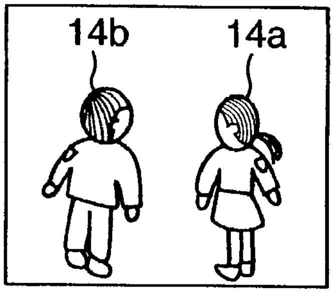
Figure 7:
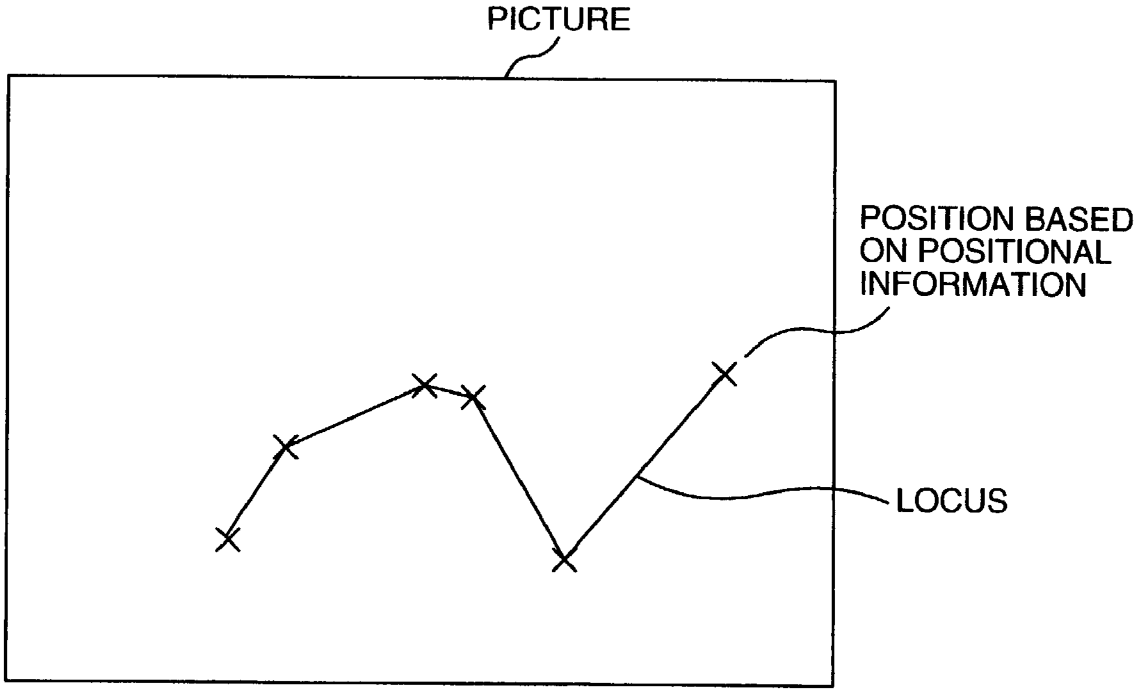
FIG. 7 is a view showing a display example of planar positional information of a subject to be monitored based on the relative positional relationship between a subject to be monitored and the image pickup apparatus, or the positional movement information thereof according to the present invention.
Figure 8A:
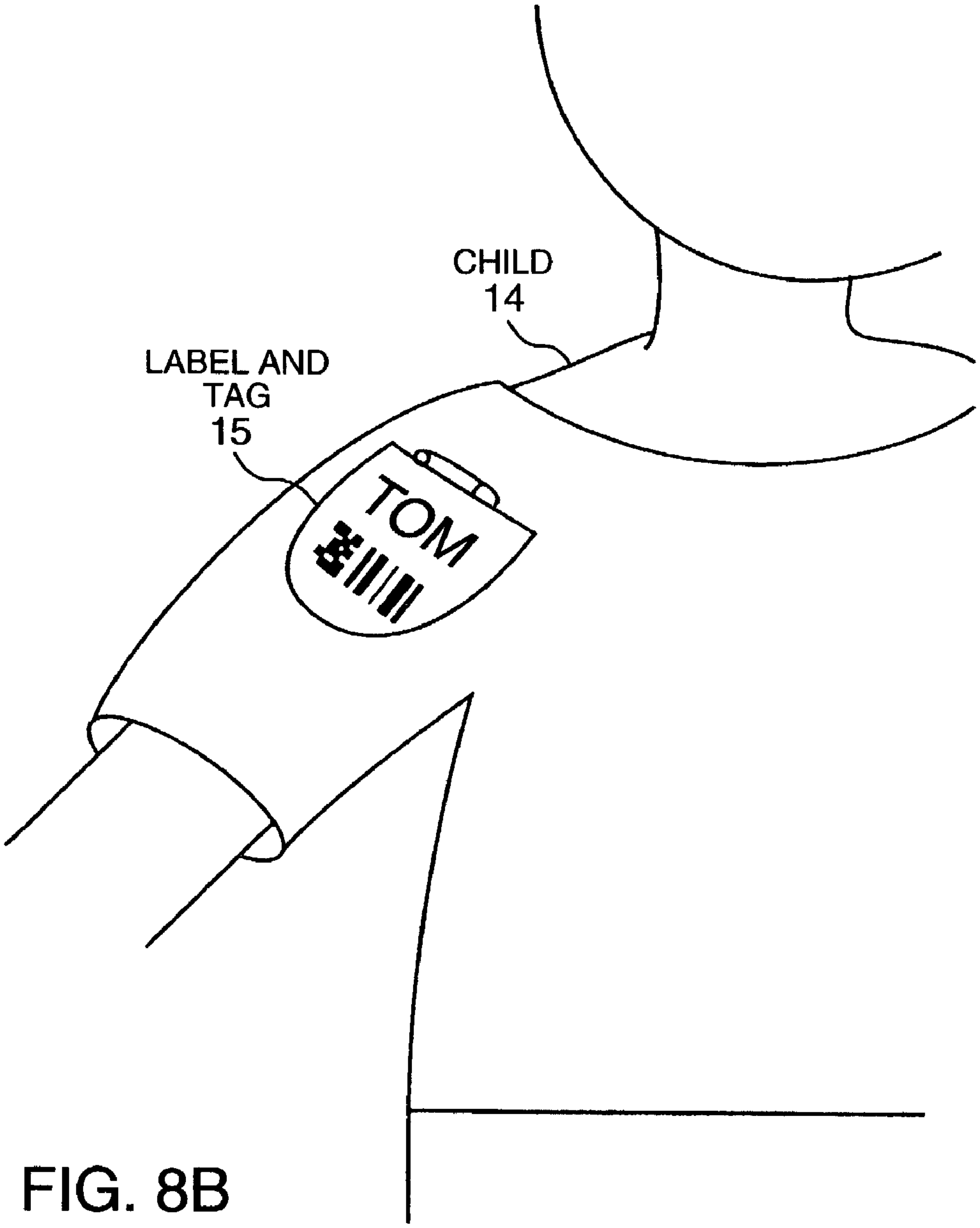
FIGS. 8A and 8B are respectively views useful in explaining the situation of a label and tag, and the state in which the label and tag is attached to a child as a subject to be monitored.
Figure 8B:
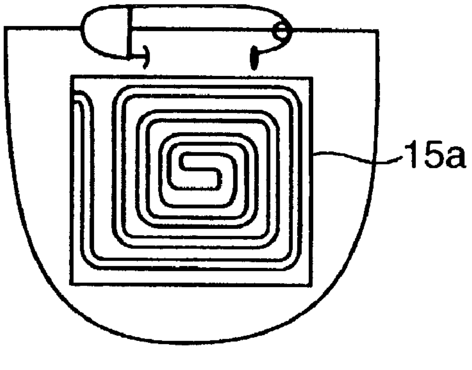
Figure 9:
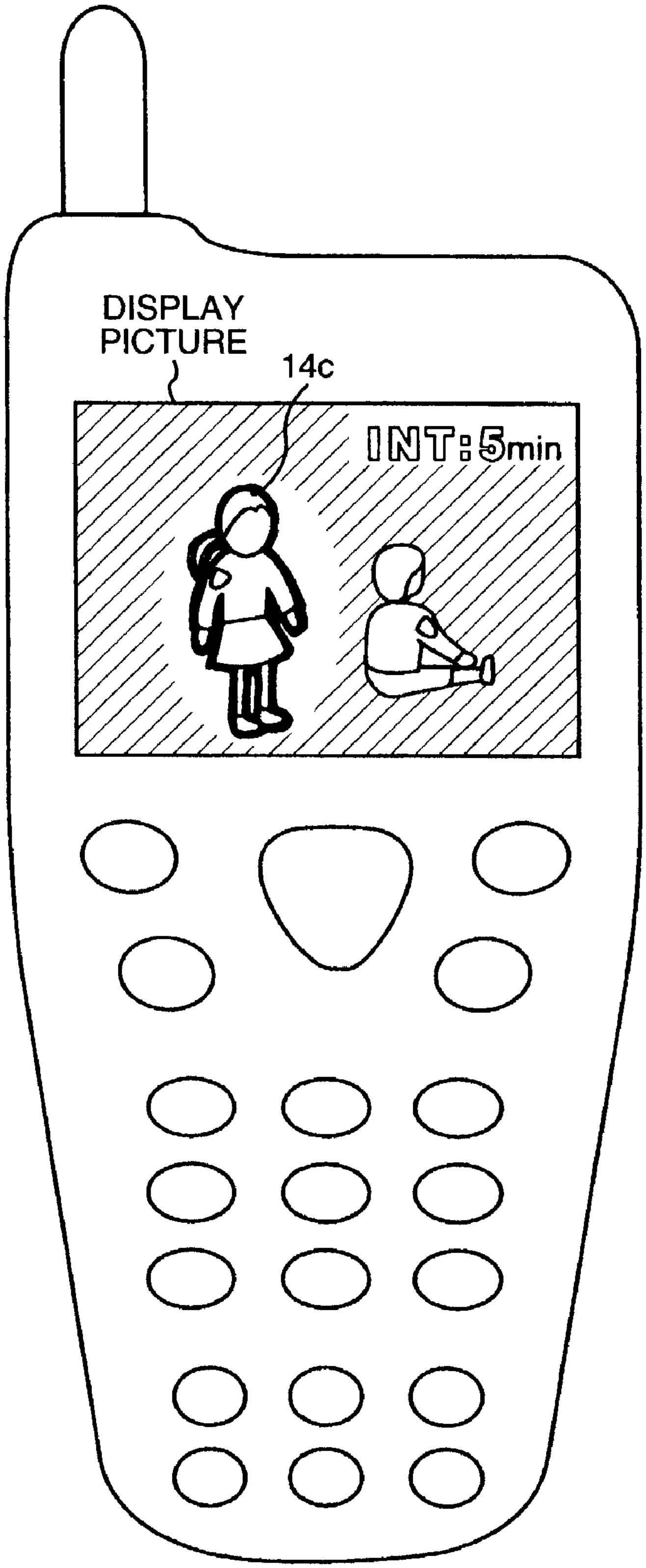
FIG. 9 is a view useful in explaining the situation in which a picture area of a child as a predetermined subject to be monitored is enhanced as compared with a picture utilization area other than that picture area.
Figure 10:
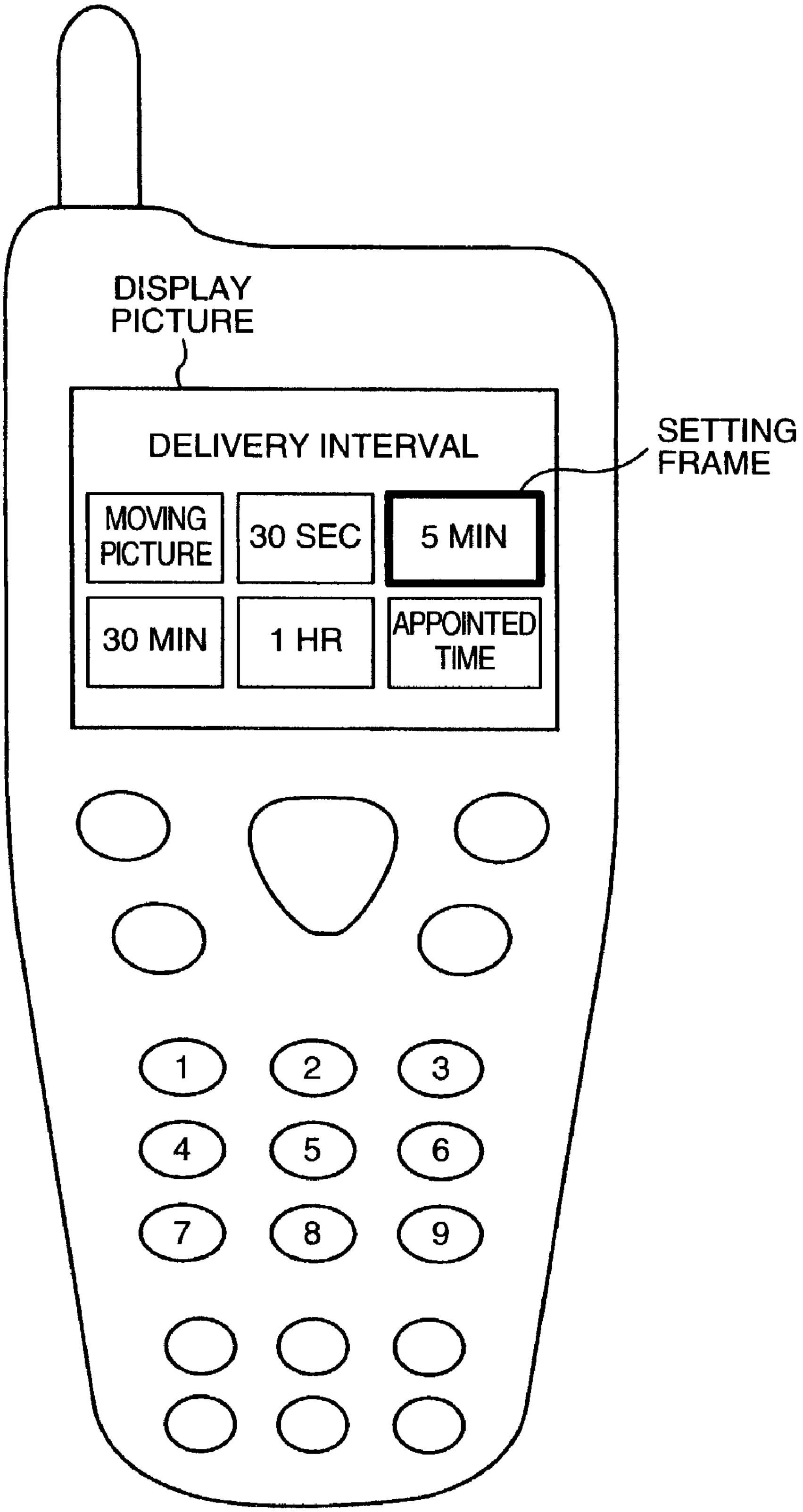
FIG. 10 is a view useful in explaining the situation of display for setting when a reception interval is set at which a monitored image signal is received by a cellular phone as a terminal.
Figure 12:
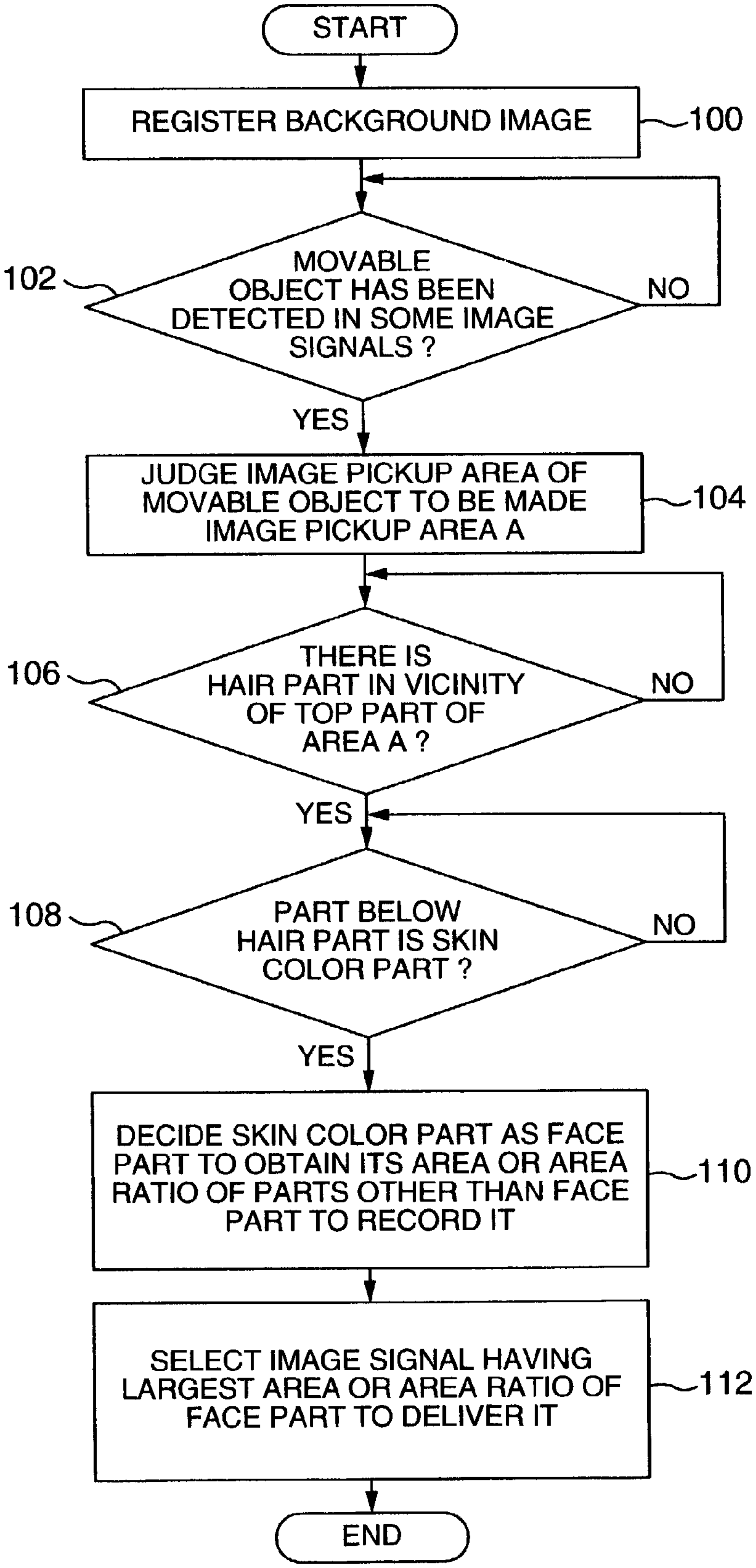
FIG. 12 is a flow chart useful in explaining an example of the operation of image signal selecting means concerned in the present invention.

FIG. 1 is a block diagram showing construction of an embodiment of a monitored image signal delivering system according to the present invention, and shows the case where the present invention, for example, is applied to the monitoring of children, nursed in a nursery school, as subjects to be monitored. FIG. 2 is a view useful in explaining schematically a monitor installed in a nursery school 1 concerned in a monitored image signal delivering system according to the present invention and the situation of an identification marker, e.g., a label and tag attached to the vicinity of the upper arm part of a child as a subject to be monitored. FIGS. 3A and 3B are respectively views showing an example of images which have been respectively obtained through the image pickup using different image pickup apparatuses. FIG. 4 is a flow chart useful in explaining an example of the operation of an image signal selecting unit concerned in the present invention. FIG. 5 is a view showing the planar arrangement of three image pickup cameras and the planar arrangement of two children each as a subject to be monitored. FIGS. 6A to 6C are respectively views exemplifying the situations of imaged pictures when the image pickup apparatuses shown in FIG. 5 imaged the two children simultaneously. FIG. 7 is a view showing an example of display of planar positional information of a subject to be monitored based on the relative positional relationship between a subject to be monitored and an image pickup apparatus, or the position movement information thereof according to the present invention. FIGS. 8A and 8B are respectively views useful in explaining the situation of a label and tag, and the state in which the label and tag is attached to a child as a subject to be monitored. FIG. 9 is a view showing the situation in which an image area of a child as a predetermined subject to be monitored is enhanced as compared with other image utilization areas. FIG. 10 is a view showing the situation of display for setting when a reception interval is set at which a monitored image signal is received by a cellular phone. FIGS. 11A to 11E are respectively diagrams each useful in explaining an example of data accumulated in a database for each subject to be imaged. FIG. 12 is a flow chart useful in explaining the operation of an embodiment of the present invention.

An embodiment of a monitored image signal delivering system according to the present invention will hereinbelow be described with reference to FIG. 1. In the figure, reference numeral 1 designates a nursery school; reference numeral 2 designates a data center; reference numeral 3 designates the Internet as a communication network; reference numeral 5, a base station; reference numeral 6, a cellular phone; and 7, a home. The nursery school 1 includes an image pickup apparatus 10, a universal head 11, a controller 12 and a gate 13. In addition, a label and tag 15 is attached to the specific part of a child as a subject to be monitored, e.g., the upper hand part, the breast part or the like, in this case, to the upper hand part. By the way, the same labels and tags 15 may also be attached to plural portions of the child 14 as a child nursed in the nursery school 1, for example, the right upper arm part and the left upper arm part of the child 14. In addition, the controller 12, for example, includes a CPU 12*a*, an I/O circuit 12*b* and a memory 12*c*. The data center 2 includes a database 20 and a web server 21 connected thereto. The controller 12 in the nursery school 1 and the database 20 in the data center 2 are connected to each other through a communication line over which a data signal such as image information or control information is transmitted between the controller 12 and the database 20. A monitor in the embodiment of the present invention is configured by combining various installations (10 to 13, and 15) installed in the nursery school 1 with the data center 2.

By the way, the controller 12 may also be directly connected to the Internet 3 to communicate with the data center 2 through the Internet 3.

Further, the web server 21 of the data center 2, and the Internet 3 are connected to each other through a communication line. The Internet 3 and the cellular phone network 4 are connected to each other, and in the present embodiment, both of the Internet 3 and the cellular phone network 4 act as the communication network.

By the way, as for the terminals in the embodiment of the present invention, there are the cellular phone 6 communicating with the base station 5 of the cellular phone network 4 in a wireless manner, a home server 70 having a personal computer (PC) provided in the monitoring person's home 7 connected to the Internet 3 through a communication line, and the like. The home server 70 includes a recorder 71 such as an HDD recorder. Each of these terminals 6, 70, etc. has a unit for receiving as its input the monitored image signal which has been obtained by imaging a subject to be monitored corresponding to the associated one of these terminals through the communication networks (3, 4), and a display unit for displaying thereon the monitored image signal thus received.

Next, the description will hereinbelow be given with respect to the monitor in the nursery school 1 concerned in the present invention and the situation of children each as a subject to be monitored. In FIG. 2, there are a plurality of children, e.g., two children 14 in the room of the nursery school 1 and one child 14 in the outside of the room for example, and the label and tag 15 is attached to the vicinity of the upper arm of each of these children. In order to image those children 14, a plurality of image pickup apparatuses 10 for image pickup are provided in the inside of the room, namely three image pickup apparatuses therefor and at least one image pickup apparatus 10 for image pickup outside of the room, namely one image pickup apparatus therefor are installed. The image signals which have been obtained by imaging those children 14 with these image pickup apparatuses 10 are outputted to the controller 12. By the way, the one image pickup apparatus for image pickup in the outside of the room is mounted on the universal head 11 which is adapted to change the direction of image pickup of the image pickup apparatus 10 mounted thereon in accordance with a control signal outputted from the controller 12. In this connection, not only the image pickup apparatus 10 for image pickup in the outside of the room, but also the image pickup apparatuses 10 for image pickup in the inside of the room may also be mounted on the universal heads 11, respectively, to make the image pickup directions thereof variable in accordance with control signals outputted from the controller 12.

In addition, the gate 13, for example, is installed in the vicinity of the doorway as the boundary between the inside of the room and the outside of the room. An LC resonance circuit 15*a* as shown in FIG. 8B, for example, is self-contained in the label and tag 15 which is attached as the member for check of the passage through the gate to the child 14 described above. As a result, when the LC resonance circuit 15*a* of the label and tag 15 has come close to the gate 13 as if a child 14 of interest having the label and tag 15 attached thereto passes through the gate 13, the LC resonance circuit oscillates in response to an electric wave radiated from an oscillator (not shown) provided in the gate 13 to output therefrom an electric wave. Then, a receiver (not shown) provided in the gate 13 receives this electric wave to output a signal as detection information from the gate 13 to the cont-roller 12. This detection information is received by the controller 12 either in a wired manner or in a wireless manner. Then, at the time when that detection information has been received by the controller, in response thereto, a child 14 who is passing through the gate 13, or has become close to the gate 13 is imaged by the image pickup apparatuses 10 to record the result of the image pickup in a recorder in the controller 12 for example. As a result, for example, a child 14 who passes through the gate 13 to go to a toilet or the like as the place where any of the image pickup apparatuses 10 can not image a child 14 of interest can be imaged to be recorded. Consequently, the image which has been obtained through the image pickup with the image pickup apparatus(es) 10 can be displayed in real time on the monitor display device 16 connected to the controller 12, or the recorded image can be reproduced to be displayed on the monitor display device 16. Thus, it is possible to confirm more readily the place where there is the child 14. By the way, the resonance frequencies of the LC resonance circuits are made different among the labels and tags 15, and the information of the correspondence relationship between the resonance frequencies of the LC resonance circuits and children 14 is previously registered either in the database 20 or in the memory within the controller 12. Then, either in the controller 12 or in the data center 2, children 14 may also be made able to be identified on the basis of the oscillation frequencies from the LC resonance circuits.

Now, for example, a table as shown in FIG. 11A is provided either in the database 20 or in the memory 12*c* within the controller 12, and the information of the correspondence relationship between the data used to identify subjects to be monitored and the terminals is previously registered therein. When a cellular phone terminal (cellular phone) is employed as the terminal, a telephone number of the cellular phone 6 as the destination of delivery of the monitored image signal obtained by imaging a subject to be monitored, a code (e.g., a bar code) for identification used to specify a child 14, as a subject to be monitored, for who a user of the cellular phone 6 desires the monitoring, a reception interval which will be described later, and the like are all registered in the table every cellular phone through the database 20 or an input circuit (e.g., a keyboard 17 (refer to FIG. 2), a bar code reader or the like) connected to the controller 12. By the way, a name of a child as a subject to be monitored may also be registered therein either instead of the identification code, or together with the identification code. Such an identification code and a name of a child as the data used to identify a subject to be monitored are the information used to identify a subject to be monitored in correspondence to a terminal.

In the present embodiment, it is assumed that such a table is provided in the database 20. By the way, such data may be inputted through a cellular phone to be registered in the database 20.

Now, as shown in FIG. 8A, a name, an identification code and the like which are used to identify a child 14 having the label and tag 15 attached thereto are displayed on the label surface of the label and tag 15 which is to be imaged by the image pickup apparatus(es) 10. For this reason, the contents of display of a name and the contents of display of the identification code on the label surface are detected from the image signal(s) obtained by imaging the label surface with the image pickup apparatus(es) 10 by the controller 12, whereby the judgement for identification of a child 14 thus imaged can be carried out in accordance with the detection result.

By the way, while not shown in any of the figures, instead of the above-mentioned LC resonance circuit, there may be employed a wireless IC card or the like (e.g., an IC card or an IC chip including a wireless communication function having such sensitivity as to allow the transmission and reception within the range of 1 to 2 m. In this case, the gate 13 is further provided with an antenna, a receiver and a transmitter for transmitting and receiving a wireless signal to and from the wireless IC card or the like. In addition, names of children 14 and the identification code information thereof are recorded in the corresponding wireless IC cards. As a result, a name of the above-mentioned child 14 and the identification code information thereof are sent from the wireless IC card or the like of the label and tag 15 to the gate 13 to be transmitted from the gate 13 to the controller 12. In the controller 12, the judgement for the identification of the imaged child 14 can be carried out by referring to the table shown in FIG. 11A on the basis of the information thus transmitted.

Then, which image signals of the image signals outputted from a plurality of image pickup apparatuses 10, respectively, are the image signals obtained by imaging children 14 each as a subject to be monitored corresponding to the cellular phones 6 which protectors of the children 14 carry can be determined by the controller 12 in accordance with the above-mentioned judgement result.

FIG. 4 is a flow chart useful in explaining the operation of the embodiment according to the present invention and useful in explaining the processings in the controller 12. It is assumed that such processings are executed by a program stored in the memory 12*c* in the controller 12.

First of all, in Step 50, the various kinds of setting information registered in the table (refer to FIG. 11A) in the database 20 is read out. Next, in Step 52, on which image signal of the image signals obtained through the image pickup with a plurality of image pickup apparatuses 10 a child as a subject to be monitored is imaged in is identified. As for the identification method, a name or(/and) an identification code on the surface of the label and tag 15 may be recognized from the associated one of the image signals to detect the image of a child as a subject to be monitored. In Step 54, the image signal on which a child as a subject to be monitored is imaged in such a way is selected and then the image signal thus selected is delivered as the monitored image signal to the cellular phone, as the terminal, as the destination of delivery of the image of a child as a subject to be monitored through the data center 2, the Internet 3 and the cellular phone network 4 in accordance with the contents of the table shown in FIG. 11A. By the way, an interval at which the monitored image signal is delivered is obedient to the reception interval shown in the table 11A. The processings in Steps 52 and 54 are executed every child as a subject to be monitored.

Now, when it is identified and judged that the same child 14 was imaged on a plurality of image signals of the image signals which have been outputted from a plurality of image pickup apparatuses 10, respectively, it is necessary to judge which image signal is the image signal which is more suitable for the image delivery. For this reason, in the controller 12, the image signal processings are further executed to select the suitable image. For example, with respect to each of the image signals outputted from a plurality of image pickup apparatuses 10, the area in which a child as a subject to be monitored was imaged is detected to detect the area in which the face part of a child 14 was imaged of the image area thus detected. Then, the areas thus detected are compared with one another among a plurality of image signals to select the image signal having the largest area. Or, with respect to each of the image areas, the number of image pickup for eyes, a nose and a mouth of the face part of a child 14, and the areas thereof are detected to select the image signal having the largest area on the basis of judging whether or not the number of image pickup and the areas thereof are larger. Then, the image signal thus selected is sent so as to be image-delivered.

Now, as for the means for selecting the above-mentioned image signal, the area occupying the color tone, such as a skin color, as the characteristic color tone of the face part of a child as a subject to be monitored as shown in FIGS. 3A and 3B is calculated with respect to each of a plurality of images obtained through the image pickup. Then, the areas thus calculated are compared with one another among a plurality of images to select the image signal having the largest area or the largest area ratio to deliver the image signal thus selected. Such a calculation and comparison processing is executed by the controller 12.

This calculation and comparison processing, for example, is executed in accordance with a flow chart as shown in FIG. 12. Also, it is assumed that such a processing is executed by the program stored in the memory 12*c* in the controller 12.

That is to say, in the flow chart shown in FIG. 12, first of all, with respect to the image signals sent from the respective image pickup ap-paratuses 10, the image obtained through the image pickup in the case where no movable object such as a child 14 as a subject to be monitored is imaged is registered in the form of the background image (Step 100). Next, the following processings are executed with respect to the image signals from the respective image pickup apparatuses 10. First of all, the registered background image is compared with each of the image signals from the respective image pickup apparatuses 10 to judge whether there is a movable object on some image signals (Step 102). If it is judged in Step 102 that there is a movable object on some image signals, then the image pickup area of the movable object is judged to make the area thus judged an area A (Step 104). On the other hand, if it is judged in Step 102 that there is no movable object on some image signals, then the processing in Step 102 is executed again.

Then, next to Step 104, with respect to the area A, whether or not the vicinity of the top part of the area A is the hair part is judged in accordance with a hue or a color tone, and the degree or the like of the monotone thereof (Step 106). If it is judged in Step 106 that the vicinity of the top part of the area A is the hair part, then whether or not the part below the hair part within the image area is the skin color part is judged in accordance with the hue or the color tone, and the degree or the like of the monotone thereof (Step 108). If it is judged that the part below the hair part is the skin color part, then the skin color part is determined as the face part. Then, the area of the face part in the image area, the ratio of the area of the face part in the image area to the area of the parts other then the face part, or the like is obtained to be recorded in the memory in the controller 12 (Step 110).

On the other hand, if it is judged in Step 106 that no hair part is detected, then the processing in Step 106 is executed again. In addition, if it is judged in Step 108 that no face part is detected, then the processing in Step 108 is executed again. By the way, executing the processing in Step 106 or 108 again is only in one embodiment, and hence the various kinds of combinations of these Steps are conceivable in accordance with the various situations or the like. For example, the processing in Step 100 may be executed again, or the operation for executing the processing in Step 106 again and the operation for executing the processing in Step 108 again may be selectively switched over to each other.

Next, in Step 112, the controller 12 compares the areas of the face part in the image area, or the area ratios thereof which were recorded every image signal in a manner as described above with one another among the image signals to select the image signal having the largest area or the largest area ratio to deliver the image signal thus selected. Consequently, in the example shown in FIGS. 3A and 3B, the image of FIG. 3A having a larger area of the face part of the image of FIG. 3A and the image of FIG. 3B is selected to be delivered.

Now, the description will hereinbelow be given with respect to the situation of the image pickup apparatuses, children and the imaged picture when selecting the image to be delivered with reference to FIG. 5 and FIGS. 6A to 6C. In FIG. 5, there is shown the planar arrangement when a child 14*a* and a child 14*b* each as a subject to be monitored in the room of the nursery school 1 are imaged with image pickup apparatuses 10*a*, 10*b* and 10*c*. Also, in FIGS. 6A to 6C, there is shown the situation of the display based on the image signals which were obtained by imaging the children

10*a* and 10*b* with the image pickup apparatuses 10*a*, 10*b* and 10*c* in that case in FIG. 5. By the way, the three image signals are the image signals which were identified and judged with respect to the children 14*a* and 14*b*. Then, it is assumed that the image signal to be delivered should be selected among the three image signals.

In this case, in FIG. 6A, the profile of the child 14*a* and the face part of the child 14*b* roughly seen head-on are imaged. In addition, in FIG. 6B, the face part of the child 14*a* seen head-on and the back of the head of the child 14*b* are imaged and hence no face part of the child 14*b* is imaged. Also, in FIG. 6C, the profile of the child 14*b* and the back of the head of the child 14*a* are imaged and hence no face part of the child 14*a* is imaged.

For this reason, the controller 12 selects, with respect to the child 14*a*, the image signal which was obtained through the image pickup with the image pickup apparatus 10*b* and on which the face part of the child 14*a* was imaged roughly in full face and hence the imaging area of that face part is maximum among the three image signals. Likewise, the controller 12 selects, with respect to the child 14*b*, the image signal which was obtained through the image pickup with the image pickup apparatus 10*a* and on which the face part of the child 14*b* was imaged roughly in full face and hence the imaging area of that face part is maximum among the three image signals.

As a result, the image signal (i.e., the image signal obtained through the image pickup with the image pickup apparatus 10*b*), having a more quantity of information concerned with the child 14*a*, as the image signal on which the face part of the child 14*a* was imaged roughly in full face is delivered from the controller 12 to the cellular phone 6 which the protector of the child 14*a* carries. Likewise, the image signal (i.e., the image signal obtained through the image pickup with the image pickup apparatus 10*a*), having a more quantity of information concerned with the child 14*b*, as the image signal on which the face part of the child 14*b* was imaged roughly in full face is delivered from the controller 12 to the cellular phone 6 which the protector of the child 14*b* carries.

By the way, the controller 12, for example, may be configured in such a way as to have such a face recognizing function described in JP-A-2001-216515 as to divide the input image into the smaller areas, detect the candidate areas of eyes and the candidate area between the eyes from the luminance feature of the small areas thus obtained, determine the area between the eyes from the positional relationship between the candidate areas of the eyes and the candidate area between the eyes, and determine the areas of the eyes and the face so as to contain the area between the eyes to identify, from the image of the face thus detected, which child 14 the image of the face of interest was obtained by imaging the child using that function.

In addition, the controller 12 may also be configured in such a way that the image signal obtained through the image pickup is analyzed, thereby generating the relative positional information between the image pickup apparatus which imaged that image and the child who was imaged and identified to record that information in the memory provided in the controller 12. In this case, it may be available that as shown in FIG. 7, the position where the child 14 as a subject to be monitored is present at each time as indicated by a mark X is displayed as the relative position within the monitoring area on the screen of the monitor display device 16 in accordance with the recorded positional information and the loci of the positions of the child 14 of interest are linked with lines every lapse of time to display the state of movement of the child 14 of interest. As a result, even if there is a period of time when the label and tag 15 attached to the child 14 of interest could not be imaged accidentally, the loci shown in FIG. 7 are displayed and confirmed on the basis of the positional information which was recorded later, whereby the rough position of the child 14 of interest can be confirmed. By the way, the positional information may also be delivered to the recorder 71 installed in the home 7 of a child as a subject to be monitored to be recorded therein in order to be reproduced and displayed on a personal computer or the like in the home.

Next, the description will hereinbelow be given with respect to both of the situation of display of the monitored image signal on the cellular phone 6 as the terminal and the setting operation. FIG. 9 shows the case where a child 14*c* as a subject to be monitored is being displayed on the cellular phone 6. In the figure, there is shown the situation in which the image area of the child 14*c* is detected by the controller 12, and the contrast is made higher with respect to the image within the image area thus detected, while the contrast is made lower with respect to the image which is out of the detected area, i.e., the part indicated by a hatched area in the figure. As a result, making the image of the child 14*c* as a subject to be monitored more conspicuous allows the monitoring to be easier for the protector of the child 14*c* who sees and recognizes the display on the cellular phone 6. Alternatively, the average luminance level of the image out of the detected area may be made lower than that of the image within the detected area.

In addition, the display of "INT: 5 min" displayed on the top right of the screen in the figure means that since the monitored image signal delivering system makes the image delivery interval (reception interval) settable, the value of the set delivery interval can be displayed. An example, of display of the set picture on the cellular phone 6, for setting the delivery interval is shown in FIG. 10. In the displayed screen shown in FIG. 10, "MOVING PICTURE" shows that the moving picture can be selected as the image to be delivered. It is assumed that when no "MOVING PICTURE" is selected, a still picture is selected. In addition, the display of "30 SEC", "30 MIN" and "1 HR" which are displayed so as to be arranged on the display screen shows one example of the delivery intervals of a still image which can be set, respectively. Then, in the figure, it is shown that the setting of "5 MIN" is surrounded with a setting frame indicated by a heavy frame and that value is already set in the cellular phone 6. By the way, with respect to the display of "APPOINTED TIME", if this display is selected, then a predetermined time can be set as the delivery time. But, the detailed description thereof is omitted here for the sake of simplicity. In this connection, as described above, the delivery interval may also be set either in the data center 2 or in the controller 12 as well.

In the embodiment of the present invention, the image signals which have been respectively selected by the controller 12 in the nursery school 1 are sent from the controller 12 to the database 20 in the data center 2 to be recorded therein. Then, the data information which has been generated in the controller 12 in relation to the image signals thus recorded is also sent as the data signal from the controller 12 to the database 20 to be recorded therein. In addition, the set information which has been set in the cellular phone 6 as described above is also sent from the cellular phone 6 to the data center 2 through the communication network to be recorded in the database 20.

Examples of the data which is accumulated in a time series manner for each subject to be monitored with respect to a plurality of kinds of information recorded in the database 20 as described above are shown in FIGS. 11B to 11E, respectively. FIG. 11B shows a table in which the positional information (i.e., the movement information) of a child as a subject to be monitored and the information of the direction of the face of a child as a subject to be monitored for each predetermined time (e.g., at intervals of 5 minutes) are recorded. Such a table is provided every child as a subject to be monitored. FIG. 11C shows a current image selection delivery information table showing when and where a child as a subject to be monitored was imaged to deliver the image, and the diaphragm value and the focal length of a camera at that time point, the position of the imaged room, and the like. Such a table is also provided every child as a subject to be monitored. FIG. 11D is a table in which a time when the monitored image signal of a child as a subject to be monitored was delivered to the terminal, and the time interval are recorded. Such a table also is provided every child as a subject to be monitored. By the way, the delivery time is implemented on the basis of the data which was set and registered in the table shown in FIG. 11A. FIG. 11E shows a delivery destination information table in which the information of the destination of delivery of the monitored image signal of a child as a subject to be monitored is recorded. Such a table is also provided every child as a subject to be monitored.

In the present embodiment, it is assumed that such tables are provided in the database 20.

Next, a second embodiment of the present invention will hereinbelow be described with reference to FIG. 13.

In the present embodiment, even when a child, nursed in a nursery school, as a subject to be monitored is not only in a nursery school as a predetermined home, but also goes to the outside of the nursery school, the child, nursed in the nursery school, as a subject to be monitored can be monitored. That is to say, for example, similarly to the case where a child as a subject to be monitored is in a nursery school, the child can be monitored even in the case where the child is in a convenience store, a video rental shop, a crossing or the like which is located near the nursery school.

Figure 13:
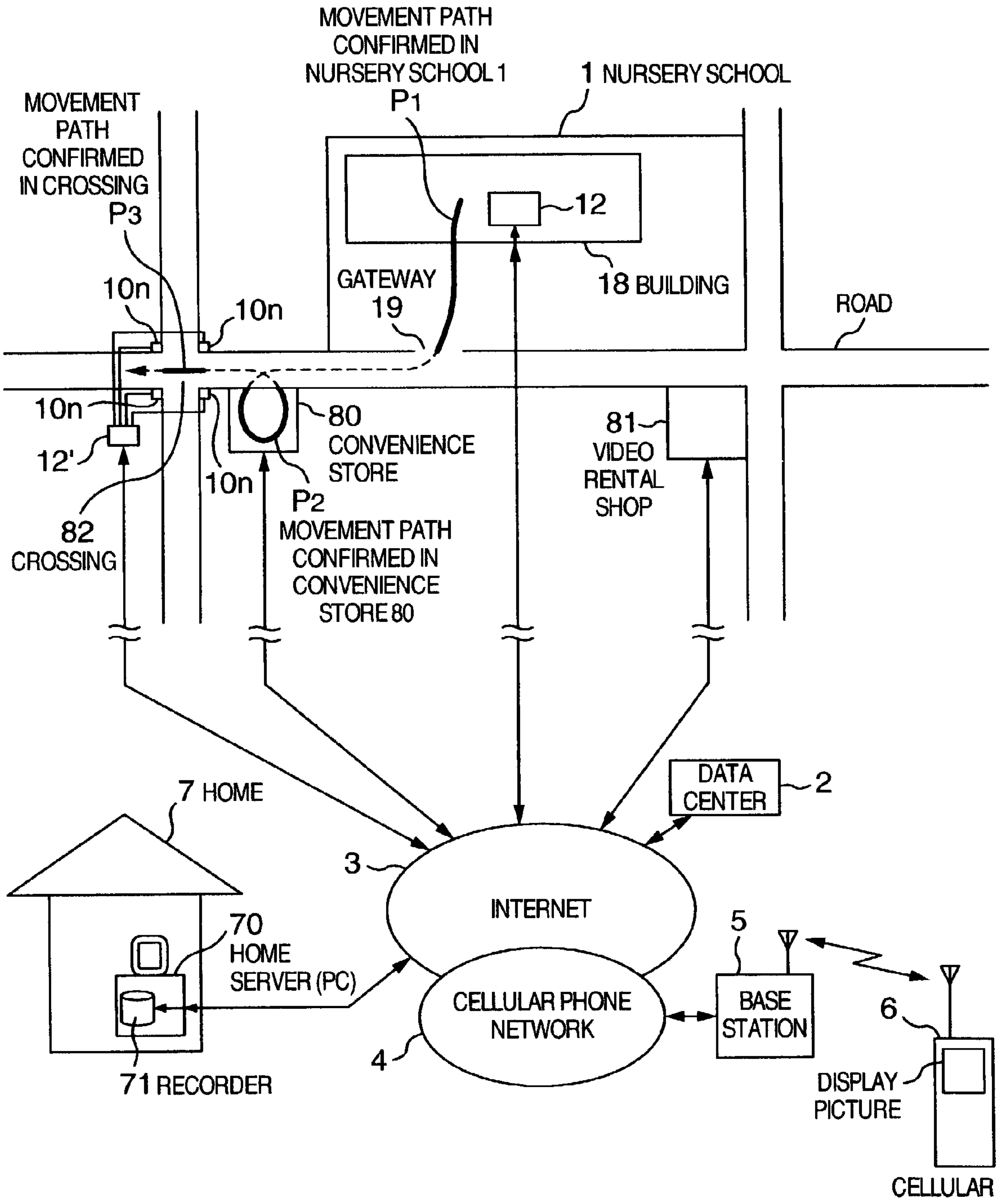
FIG. 13 is a block diagram showing construction and the like of a second embodiment of a monitored image signal delivering system according to the present invention.

FIG. 13 is a block diagram showing construction and the like of the second embodiment of a monitored image signal delivering system according to the present invention. By the way, in the figure, the nursery school 1 through a gateway 19, a convenience store 80, a video rental shop 81 and a crossing 82 are illustrated in such a way as to be arranged so as to face to a road in order to show schematically the relative positional relationship on the map or geography. In addition, in FIG. 13, the same constituent elements as those in FIG. 1 are designated by the same reference numerals and the description thereof is omitted here for the sake of simplicity.

The controller 12 installed in the inside of a building 18 of the nursery school 1 is connected to the data center 2 through the Internet 3. By the way, similarly to FIG. 1, the controller 12 may also be connected to the Internet through the data center 2. In addition, each of the convenience store 80 and the video rental shop 81, while not illustrated, similarly to the nursery school 1 shown in FIG. 1, is provided with at least one image pickup apparatus 10 for imaging the situation in the store or the shop and a controller 12'. Also, the crossing 82 is provided with at least one image pickup apparatus 10*n* (four image pickup apparatuses in the example shown in FIG. 13) for imaging the situation in the crossing 82 and the situation in the vicinity of the crossing 82. These image pickup apparatuses 10*n* are connected to the controller 12'. The controller 12' has the same function as that of the controller 12. The controllers 12' in the convenience store 80, the video rental shop 81 and the crossing 82 are respectively connected to the data center 2 through the Internet 3.

The data center 2 operates in a similar manner to that of the first embodiment shown in FIG. 1 except that with respect to the monitored images obtained through the image pickup in the convenience store 80, the video rental shop 81 and the crossing 82 as well as the monitored images obtained through the image pickup in the nursery school 1, the images on which a subject to be monitored is identified are delivered.

In such a case, for example, at the time when the fact that a child as a subject to be monitored in the nursery school 1 went to the outside through the gateway 19 of the nursery school 1 has been detected by the gate 13 provided in the gateway 19 for example, the software resource for identifying that child may be sent to the controllers 12' installed in the convenience store 80, the video rental shop 81 and the crossing 82 near the nursery school 1, respectively, through the Internet 3. Each of the controllers 12' received the software resources sent thereto identifies a subject to be monitored using the associated one of the software resources. Then, each of the controllers 12' transmits the image on which a subject to be monitored has been identified to the data center 2.

As described above, it becomes possible to not only confirm a subject to be monitored only in the nursery school 1 to confirm the movement path (corresponding to a locus P1 indicated by a heavy line in FIG. 13) of the subject to be monitored thus confirmed, but also to confirm the subject to be monitored in the convenience store 80 to confirm the movement path (corresponding to a locus P2 indicated by a heavy line in FIG. 13) of the subject to be monitored thus confirmed, to confirm the subject to be monitored in the video rental shop 81 to confirm the movement path (locus) of the subject to be monitored thus confirmed and to confirm the subject to be monitored in or around the crossing 82 to confirm the movement path (corresponding to a locus P3 indicated by a heavy line in FIG. 13) of the subject to be monitored thus confirmed. As a result, the situation when a child as a subject to be monitored was lost, confirming whether or not a child as a subject to be monitored has something to do with any other person(s), or the like can readily carried out, which results in that the discovery of a child, the security of a child by the persons concerned with a nursery school or the protector, and the like becomes easier.

Figure 14:
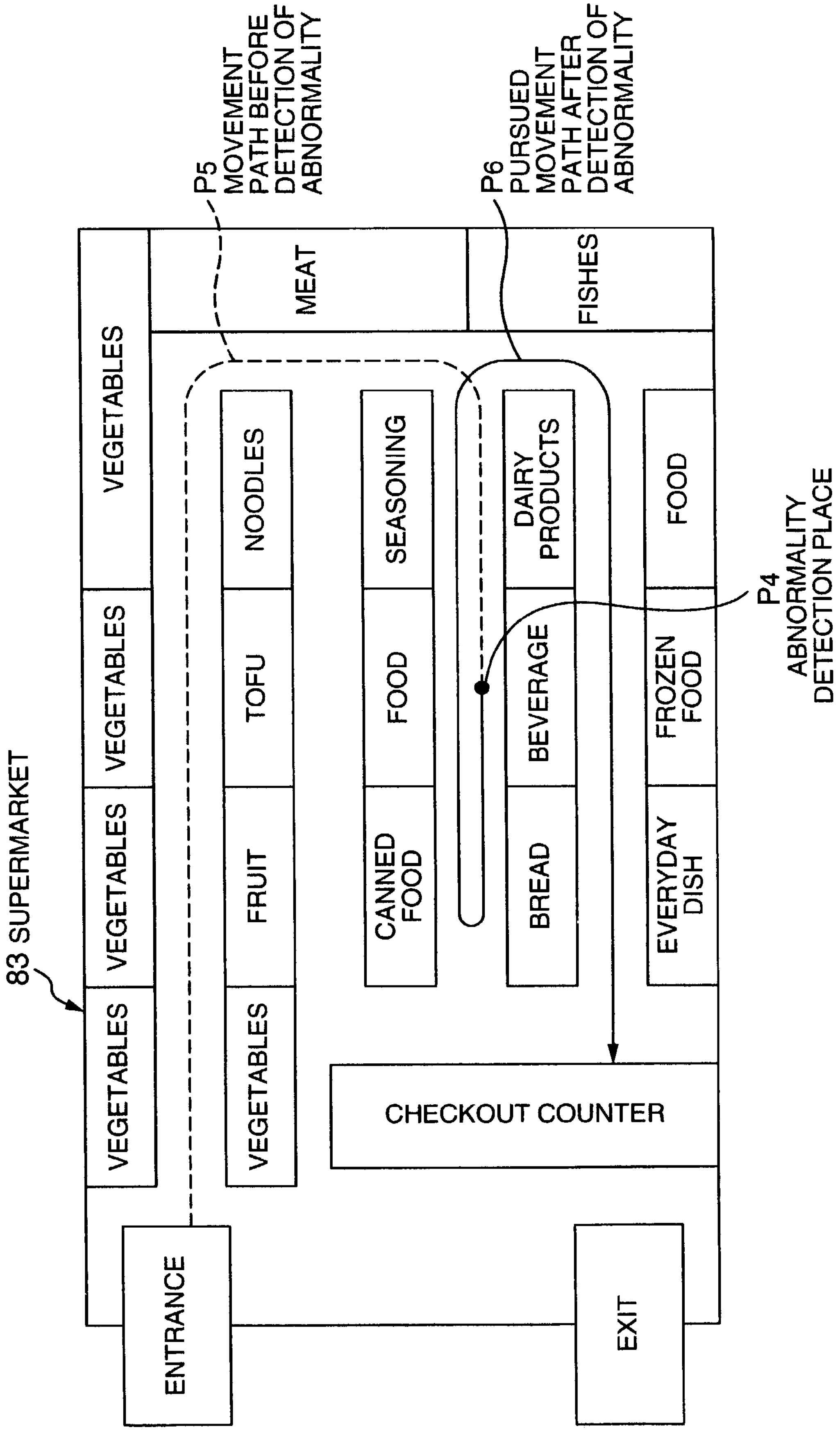
FIG. 14 is a block diagram showing construction and the like of a third embodiment of a monitored image signal delivering system according to the present invention.

Next, a third embodiment of the present invention will hereinbelow be described with reference to FIG. 14.

The present embodiment is such that when the abnormality occurs in a store, e.g., a supermarket, a person(s) associated with that abnormality can be monitored. FIG. 14 is a plan view of the arrangement of foods and the like in a supermarket 83 useful in explaining the third embodiment of a monitored image signal delivering system according to the present invention.

In the figure, an entrance, an exit, and a checkout counter are provided within the supermarket 83. Further, a large number of exhibit cases are disposed on which foods for selling such as vegetables and meets are arranged, and there are passages through which purchasers or the like pass between the exhibit cases. Now, while not illustrated in the figure, a plurality of image pickup apparatuses 10 for imaging those exhibit cases and those passages roughly throughout, and a controller 12" are installed therein.

Furthermore, it is assumed that a unit for recognizing such an abnormal action as for a person feigning as if he(she) is a customer to draw out the food(s) from the exhibit case(s) to conceal it(them) is provided within the controller 12".

Now, a unit for when that recognition unit has recognized the abnormality from the images obtained through the image pickup, recognizing the face of a person concerned in the abnormality is further provided within the controller 12" so that the person of interest can be identified among the images obtained with the image pickup apparatuses by the recognition unit. Each of those units provided in the controller 12" may be configured in the form of hardware or software. Then, the images on which the identified person was taken, for example, are delivered to a cellular phone which a person in charge of guard carries so that the person in charge of guard can confirm the images delivered thereto on the display picture of the cellular phone. In addition, the movement path of that person after occurrence of the abnormality is confirmed. As a result, the person in charge of guard can always mark a person of interest and also when for example, a certain person is going to go out from the store 83 without clearing up the payment at the checkout counter, can call the marked person to stop to confirm whether or not there was the action concerned in the abnormality. By the way, in the figure, reference symbol P4 designates the place where the abnormality (corresponding to the case where a certain person carried out the shoplifting for example) was detected, reference numeral P5 designates the movement path of that person before detection of the abnormality, and reference symbol P6 designates the movement path of that person after detection of the abnormality.

By the way, while the above description has been given with respect to the case where the monitored image signal on which a subject to be monitored was imaged is delivered to the cellular phone 6 as the destination of delivery, such a monitored image signal may also be delivered to the home server 70 at the home 7. In this case, the moving picture of a child as a subject to be monitored may be delivered to the recorder 71 of the home server 70 and also may be delivered to the cellular phone 6 at intervals of 1 hour for example. In such a way, the moving pictures thereof may be delivered at the individual reception intervals. In addition, of course, the monitored image signal may be delivered to one of the cellular phone 6 or the home server 70 at the home 7 in accordance with the desire of a user. In this connection, when the monitored image signal is delivered to the home server 70 at the home 7, the table similar to that shown in FIG. 11A is provided either in the database 20 or in the memory 12*c* in the controller 12 so that a mail address, as the destination of delivery, of the home server 70 at the user's home 7, a code for identification of a child 14 as a subject to be monitored, and information of a delivery interval may be set in that table.

In addition, with respect to a subject to be monitored or a subject of the monitoring, in order to ensure the security for watchers going out for watching in an institution as well as for children nursed in a nursery school as described above, to avoid inpatients or persons admitted to an institution from suffering the danger in the various places such as a hospital or a house for the aged, or to monitor staffs, robots, animals or the like in other various places, all of movable objects containing these persons or the like may be treated as subjects.

In addition, in the above-mentioned embodiments, a plurality of image pickup apparatuses are provided in an institution. Alternatively, however, one image pickup apparatus may be provided in an institution with it being mounted on a universal head so as to make the image pickup detection variable in accordance with a control signal from a controller to send image signals obtained by imaging a subject to be monitored in an institution to the corresponding terminal.

As set forth hereinabove, according to the present invention, for example, even when images which have been obtained by imaging a child(s) nursed in a nursery school, as a subject(s) to be monitored, or by imaging various kinds of subjects to be monitored are transmitted to be displayed on an associated one(s) of cellular phones or the like as terminals, it is possible to realize a monitored image signal delivering system which is capable of further reducing a cost required for the communication of image data. In addition thereto, it is possible to realize a monitored image signal delivering system by which an image which an operator for a terminal or the like such as a protector desires, e.g., an image on which a child who the protector is concerned in can be displayed on the terminal at any time. Thus, when monitoring continuously a subject to be monitored, it is possible to further enhance the transmission efficiency or the work efficiency required for the monitoring work.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A monitored image signal delivering system comprising:

a monitor;

a communication network; and a plurality of terminals for delivering images obtained by picking up images of subjects to be monitored using said monitor, said picked up images being transmitted to said terminals through said communication network, wherein said monitor having a plurality of image pickup apparatuses for picking up images of the subjects to be monitored and outputting respective monitored image signals of the subjects, and a controller for transmitting the respective monitored image signals which have been obtained by imaging the subjects to be monitored corresponding to ones of said terminals, to ones of said terminals, respectively, wherein said plurality of terminals each having a unit for receiving as its input a monitored image signal which has been obtained by imaging an associated one of the subjects to be monitored corresponding to an associated one of said terminals from said monitor, and a display unit for displaying thereon the monitored image signal thus received, and wherein said monitor further has a unit for obtaining relative positional relationship between the subjects to be monitored on the monitored image signals and associated ones of said image pickup apparatuses which imaged the subjects to be monitored based on the monitored image signals, a unit for recording therein positional information of the obtained positional relationship, and a unit for displaying thereon either the positional information of the subjects to be monitored or position movement information thereof based on the obtained positional relationship.

2. A monitored image signal delivering system according to claim 1, wherein identification markers corresponding to the subjects to be monitored are attached to the subjects to be monitored, respectively, wherein said controller further has a unit for detecting the identification markers attached to the subjects to be monitored, respectively, and a unit for identifying associated ones of said terminals corresponding to the detected identification markers, and wherein said controller transmits the monitored image signals to the identified terminals, respectively.

3. A monitored image signal delivering system according to claim 2, wherein said identification markers are label identification information corresponding to the subjects to be monitored.

4. A monitored image signal delivering system according to claim 2, wherein identification markers which are the identification markers corresponding to the subjects to be monitored, respectively, and which can be imaged using said image pickup apparatuses are respectively attached to the subjects to be monitored, wherein said monitor further has a unit for detecting images of the identification markers from the image signals which have been obtained by imaging the identification markers, and a unit for identifying the associated ones of said terminals corresponding to the detected identification markers, and wherein said monitor transmits the image signals each having the image of the identification marker in the form of the monitored image signals to the identified terminals.

5. A monitored image signal delivering system according to claim 4, wherein the identification markers are either identification codes used to specify the subjects to be monitored, respectively, or names of the subjects to be monitored.

6. A monitored image signal delivering system according to claim 4, wherein said monitor further includes a memory for storing therein the positional information of the correspondence relationship between said terminals and the identification markers of the subjects to be monitored, and a unit for transmitting the image signal having the image of the identification marker in the form of the monitored image signal to the identified terminal by referring to said memory.

7. A monitored image signal delivering system according to claim 1, wherein members with each of which the passage through a gate is checked are attached to the subjects to be monitored, respectively, and wherein said monitor further has a gate apparatus for detecting that the member has passed through said gate, and said image pickup apparatuses for imaging the subject to be monitored having said detected member attached thereto.

8. A monitored image signal delivering system according to claim 1, wherein members with each of which the passage through a gate is checked are attached to the subjects to be monitored, respectively, and wherein said monitor further has a gate apparatus for detecting that the member has passed through said gate, and a unit for identifying the subject to be monitored having said detected member attached thereto.

9. A monitored image signal delivering system according to claim 1, wherein said monitor further has a unit for image-processing the monitored image signals to detect image areas in which the subjects to be monitored were respectively imaged, and a unit for subjecting the monitored image signals to a predetermined image signal processing in accordance with the detected image areas.

10. A monitored image signal delivering system according to claim 1, wherein each of said terminals has a unit for setting a reception interval at which the associated one of said terminals receives the monitored image signal of the subject to be monitored corresponding to the terminal of interest, and a unit for transmitting information of the set reception interval to said monitor, wherein said monitor further has a unit for receiving the information of the reception intervals transmitted from said terminals, and wherein said monitor transmits the monitored image signals to said corresponding terminals at the transmission intervals corresponding to the received information of the reception intervals corresponding to said terminals.

11. A monitored image signal delivering system according to claim 1, wherein said monitor further has a unit for selecting the monitored image signals each having a large quantity of information concerned with an associated one of the subjects to be monitored of the plurality of monitored image signals, and wherein said monitor transmits the monitored image signals thus selected to said terminals, respectively.

12. A monitored image signal delivering system according to claim 1, wherein at least one of the Internet network or a portable wireless telephone network is employed as said communication network, and either a portable wireless telephone terminal or a personal computer is employed as at least one of the terminals.

13. A monitored image delivering method of delivering images in a monitored image signal delivering system including a monitor, a communication network, and a plurality of terminals for delivering images obtained by picking up images of subjects to be monitored using said monitor, said picked up images being transmitted to said terminals through said communication network, said method comprising the steps of:

transmitting monitored image signals which have been obtained by imaging the subjects to be monitored corresponding to said terminals from a plurality of image pickup apparatuses to said corresponding terminals, respectively; and receiving the monitored image signals which have been obtained by imaging the subjects to be monitored corresponding to said terminals at said terminals to display the monitored image signals thus received, wherein said monitor further has a unit for obtaining relative positional relationship between the subjects to be monitored on the monitored image signals and associated ones of said image pickup apparatuses which imaged the subjects to be monitored based on the monitored image signals, a unit for recording therein positional information of the obtained positional relationship, and a unit for displaying thereon either the positional information of the subjects to be monitored or position movement information thereof based on the obtained positional relationship, wherein said plurality of terminals each having a unit for receiving as its input a monitored image signal which has been obtained by imaging an associated one of the subjects to be monitored corresponding to the associated one of said terminals from said monitor, and a display unit for displaying thereon the monitored image signal thus received, and wherein said monitor further has a unit for obtaining the relative positional relationship between the subjects to be monitored on the monitored image signals and the associated ones of said image pickup apparatuses which imaged the subjects to be monitored based on the monitored image signals, a unit for recording therein the information of the obtained relationship, and a unit for displaying thereon either the positional information of the subjects to be monitored or the position movement information thereof based on the obtained positional relationship.

* * * * *